UNITED STATES PATENT OFFICE.

HAROLD ASHTON RICHARDSON, OF LONDON, ENGLAND.

HARDENED-STEEL PLATE AND LIKE ARTICLE.

1,035,908.

Specification of Letters Patent. Patented Aug. 20, 1912.

No Drawing. Application filed June 3, 1910. Serial No. 564,781.

*To all whom it may concern:*

Be it known that I, HAROLD ASHTON RICHARDSON, a subject of the King of Great Britain and Ireland, residing at London, England, have invented certain new and useful Improvements in Hardened-Steel Plates and Like Articles, of which the following is a specification.

My said invention relates to improvements in hardened steel or like plates designed more especially for armor plates and other purposes, for which plates hardened on one surface are required. In known processes for the manufacture of such plates, a mild steel containing 0.3 per cent. of carbon is subjected to a cementation process, the plates being placed in a furnace and covered with carbon on one side, and then heated for seven or eight days at a red heat. The plates are then quenched in water, which hardens the portion of the steel which has been carburized. In some cases the steel before hardening has been heated to a red heat and plunged in water, and then again heated to a somewhat lower heat, and again plunged in water to give the plate a fibrous structure, the fibrous plate being then hardened by subjecting the surface which requires hardening to a higher temperature, and quenching.

The object of the present invention is to obtain a cement steel plate or like article having a glass hard surface which will be especially adapted for armor plates and similar purposes, and the invention includes a plate of the novel composition hereinafter described and particularly defined by the appended claims.

In producing a plate according to my invention, I prepare an alloy containing molybdenum or tungsten or the equivalent quantity of both, and from .2 to .5 per cent. of carbon, subjecting the same to a cementation process, whereby a glass hard surface is produced without quenching, the molybdenum being distributed throughout the plate or article, and the carbon through the back portion of the plate or article in the proportions specified with a further proportion of carbon in the face of the plate or article, the process being carried out by any open hearth process by which a pure steel free from phosphorus and sulfur can be obtained.

I find that improved results may be secured by using nickel in connection with the foregoing ingredients, and improved armor plates may advantageously be secured by providing ingots containing one per cent. of molybdenum, four per cent. of nickel, and three tenths per cent. of carbon, which ingots are rolled to the desired thickness of plate, and the plates covered with oak charcoal or other carbon on one surface, and heated for from seven to eight days at a red heat, as is usual in the cementation process. Other articles can be formed and their surfaces treated in a similar manner.

By the above treatment a plate having a glass hard surface is obtained without quenching.

I also find that all or part of the nickel may be replaced by cobalt.

Having now described my invention what I claim as new and desire to secure by Letters Patent is:—

1. Cement steel plates or other articles having a glass-hard surface containing molybdenum at least 1 per cent. throughout the plate or article, carbon 0.2 to 0.5 per cent. through the back portion of the plate or article and a further proportion of carbon in the face of the plate or article, as set forth.

2. Cement steel plates or other articles having a glass-hard surface containing at least 1 per cent. of molybdenum, 4 per cent. of nickel and 0.3 per cent. of carbon throughout the back portion of the plate or article and an additional proportion of carbon in the face of the plate or article, as set forth.

In testimony whereof, I affix my signature in presence of two witnesses.

HAROLD ASHTON RICHARDSON.

Witnesses:
ANNIE F. KAHN,
P. A. OUTHWAITE.